(12) United States Patent
Hood (10) Patent No.: US 7,229,059 B1
(45) Date of Patent: Jun. 12, 2007

(54) DETACHABLE SWIMMING POOL SHADE AND SPORT MOUNTING

(75) Inventor: Robert K. Hood, Bullhead City, AZ (US)

(73) Assignee: Too Kool Recreation, LLC, Fort Mohave, AZ (US)

( * ) Notice: Subject to any disclaimer, the term of this patent is extended or adjusted under 35 U.S.C. 154(b) by 0 days.

(21) Appl. No.: 10/688,696

(22) Filed: Oct. 20, 2003

(51) Int. Cl.
*F16M 11/00* (2006.01)

(52) U.S. Cl. ............... 248/518; 248/205.8; 248/363

(58) Field of Classification Search ............ 248/518, 248/511, 205.5, 205.6, 205.7, 205.8, 206.1, 248/206.2, 206.3, 206.4, 362, 363, 224.8, 248/22.52, 222.5; 403/348, 349, 361
See application file for complete search history.

(56) References Cited

U.S. PATENT DOCUMENTS

| | | | | |
|---|---|---|---|---|
| 3,020,017 A | * | 2/1962 | Watson | 248/205.8 |
| 3,851,601 A | * | 12/1974 | Davis | 108/158.11 |
| 4,844,395 A | | 7/1989 | Perentin | 248/205.8 |
| 4,903,926 A | | 2/1990 | McNarry et al. | 248/214 |
| 5,813,641 A | | 9/1998 | Baldwin | 248/223.41 |
| 5,915,482 A | * | 6/1999 | Carruthers | 172/375 |
| 5,996,951 A | | 12/1999 | O'Burill et al. | 248/205.8 |
| 6,019,337 A | * | 2/2000 | Brown | 248/354.5 |
| 6,126,359 A | * | 10/2000 | Dittrich et al. | 403/349 |
| 6,216,629 B1 | | 4/2001 | Straub | 116/209 |
| 6,663,070 B2 | * | 12/2003 | Valentz et al. | 248/354.1 |
| 6,749,160 B1 | * | 6/2004 | Richter | 248/206.2 |
| 2002/0158033 A1 | * | 10/2002 | Chen | 211/103 |

* cited by examiner

*Primary Examiner*—Ramon O Ramirez
(74) *Attorney, Agent, or Firm*—Maier & Maier, PLLC (57) ABSTRACT

An improved mounting apparatus for providing shade, sport, banner and recreational equipment for swimming pool and other locations. The base of the mounting apparatus is comprised of at least one lever activated strong suction cup member easily manually attached to a receptacle unit for accepting and holding vertical pole units, the top sections of which have various athletic, recreational and shade providing equipment. The improvement resides in allowing the mounting apparatus to be affixed to a vertical or horizontal surface, either wet or dry, thus not limiting its positioning or location in a swimming pool or on other hard, smooth, clean and flat surfaces such as on recreational vehicles and boats. These mounting apparatus are readily removable for convenience and light weight and economical to manufacture. Novel handle designs as levers for activating the suction cup members are also presented.

4 Claims, 5 Drawing Sheets

DETACHABLE SWIMMING POOL SHADE AND SPORT MOUNTING

FIELD OF INVENTION

This invention relates to easily operable and detachable mounting apparatus for recreational and shade providing devices for use in swimming pools, on vehicles and in various other environments.

BACKGROUND OF THE INVENTION

Swimming pool users have found they can increase the enjoyment and safety of pools by adding devices which provide shade, sports, game playing, and depth indicating equipment. Generally such devices have been installed using bases mounted to the pool deck with fasteners such as the anchor bolts described in U.S. Pat. No. 6,216,629. Another method, shown in U.S. Pat. No. 4,903,926, involves mooring brackets fastened to the coping on the pool or the ground beside the coping. Still another, shown in U.S. Pat. No. 5,813,641 utilizes a removable clamp bracket for supporting an object from an elongated channel member which has spaced grooves formed in one surface. The clamp bracket may be positioned at any point along the length of the channel member, but is limited to this path.

Other, heavily weighted and bulky bases for holding sports objects like basketball backboards and volleyball nets usually have to be used just outside the pool proper because of their large size, but with the hope that the balls thrown at them somehow return to the swimming pool from which they were launched.

All of the above methods have undesirable consequences. Drilling of holes in pools for fastener mounting is damaging and invasive and limits the locations for placing shade and recreational equipment. Supporting objects from elongated channel members is also location limiting. While the use of heavily weighted and bulky bases can keep sports activities out of the pool water, where it is desired. These described methods are also relatively expensive.

The use of suction cups has been available for many years. A typical use involves a plastic suction cup with a hook attached to the center of its non-suction side for attachment to a glass window for hanging a transparent decorative item or for sticking onto the tile in a bathroom for holding a squeegee. More recently, however, suction cup devices have become more sophisticated and powerful. Representative suction cup devices used as a means for supporting articles are shown in U.S. Pat. Nos. 4,844,395 and 5,996,951. The '395 patent discloses the support of garments in a show window and the '951 article shows a use for holding a horizontal drying rack.

SUMMARY

In accordance with the present invention a versatile mounting apparatus is provided for use on smooth, flat and clean surfaces in swimming pools and dry locations for providing shade from the sun and holding a myriad of equipment for engaging in sports, recreational activities and displaying flags and banners. The mounting apparatus is comprised of at least one lever activated strong suction cup member connected to a body component containing a receptacle holder for a vertical pole type unit whose top section houses the various athletic, recreational and shade providing equipment.

Several objects and advantages of the present invention are:
a) To provide a mounting apparatus that is easily and quickly attached.
b) To provide a mounting apparatus that is easily and quickly detached.
c) To provide a mounting apparatus that is reusable.
d) To provide a mounting apparatus that can be used on any solid, smooth, flat and clean surface.
e) To provide a mounting apparatus that can be noninvasively affixed to a wet or even under water surface, a totally dry surface, and even a partially wet, partially dry surface.
f) To provide a mounting apparatus that can be noninvasively affixed to either a vertical or horizontal surface.
g) To provide a mounting apparatus that provides maximum swimming pool location flexibility since it can be affixed to the bottom surface and also along any of the sides of the pool.
h) To provide a mounting apparatus that is designed to be commercially viable.
i) To provide a mounting apparatus with easily detachable and installable replacement parts.

DRAWINGS

In the drawings, closely related figures have the same number but different alphabetic suffixes.

REFERENCE NUMERALS IN DRAWINGS

| 10 | Suction Pad | 12 | Suction Housing |
|---|---|---|---|
| 14 | Washer | 16 | Handle Base |
| 17 | Pin Slot | 18 | Pin Hole |
| 20 | Pin | 22 | Side Support |
| 24 | Handle | 26 | Tooth |
| 28 | Locking Arm | 29 | Socket |
| 30 | Groove | 32 | Reducer |
| 34 | Receptacle Tube | 36 | Compression Fitting Base |
| 38 | Screw Hole | 40 | Set Screw |
| 42 | Compression Fitting Cap | 44 | Receptacle Inlet |
| 46 | Disk | 48 | Shaft |
| 50 | Spring | 54 | Compression Fitting Nipple |
| 56 | CompressionFitting Washer | 62 | Receptacle Outlet |
| 64 | Receptacle Leg | 66 | Stabilizing Arm |
| 68 | Bumper | 70 | Receptacle Pin Hole |
| 72 | Locking Pin | 74 | Ring |
| 76 | Left Arm | 78 | Right Arm |
| 80 | Handle Lever | 82 | Handle Arm |
| 84 | Handle Pin Hole | 86 | Ball Handle |
| 88 | Key Slot | 90 | Horizontal Mounting Receptacle Inlet |
| 92 | Receptacle Outlet | 94 | Bottom Leg |
| 96 | Right Bottom Arm | 98 | Left Bottom Arm |
| 100 | Lower Receptacle Tube | 102 | Horizontal Mounting Receptacle |
| 104 | Horizontal Mounting Bottom Receptacle | | |
| 105 | Weep Hole | 106 | Receptacle Tube |
| 108 | Right Top Arm | 110 | Left Top Arm |
| 112 | Vertical Mounting Pin Hole | 114 | Horizontal Mounting Pin Hole |
| 116 | Top Receptacle Tube | 118 | Ball Handle Pin Hole |
| 120 | Ball Handle Cavity | 122 | Key |
| 127 | Short Right Arm | 128 | Short Center Arm |
| 129 | Short Left Arm | 130 | Long Receptacle Tube |
| 132 | Pin Hole | 134 | Left Extension Arm |
| 136 | Right Extension Arm | 138 | Center Extension Arm |
| 140 | Left Anchor Plate | 142 | Right Anchor Plate |
| 144 | Center Anchor Plate | 146 | Left Plate Vertical Seal |
| 148 | Center Plate Vertical Seal | 150 | Left Plate Bottom Seal |
| 152 | Right Plate Bottom Seal | 154 | Center Plate Bottom Seal |
| 157 | Swimming Pool | 158 | Recreational Vehicle |
| 159 | Boat | 160 | Volleyball Net |
| 162 | Four Suction Cup Mounting Apparatus | 164 | Umbrella |
| 166 | Double Suction Cup Mounting Apparatus | | |
| 168 | Basketball Backboard, Net and Pole | | |
| 170 | Five Suction Cup Mounting Apparatus | 172 | Pendant and Pole |
| 174 | Single Suction Cup Mounting Apparatus | 176 | Flag and Pole |
| 178 | Banner and Two Poles | | |

DETAILED DESCRIPTION OF THE INVENTION

As seen in the present invention, using from one to several lever activated strong suction cup devices as a base for affixing to either the side or bottom of a swimming pool, said base having an attached main body containing a receptacle for accepting vertical pole type devices, the top sections of which are adapted for various athletic, recreational, shade and safety providing equipment is most desirable. These mounting apparatus are not location limited and are removable. No permanent harm or holes are made to the swimming pool and their cost of manufacture is not excessive. In addition, they can be mounted in numerous other places besides pools, such as on cars, recreational vehicles and boats.

Description—FIGS. 1A, 1B, 1C, 1D, 2A, 2B, 2C, 2D, 2E, 3A, 3B, 3C, 3D, 3E, 4, 5A, 5B and 5C—Preferred Embodiments Like characters of reference designate like parts in those figures of the drawings in which they occur.

Figures 1A, 1B, 1C, 1D:
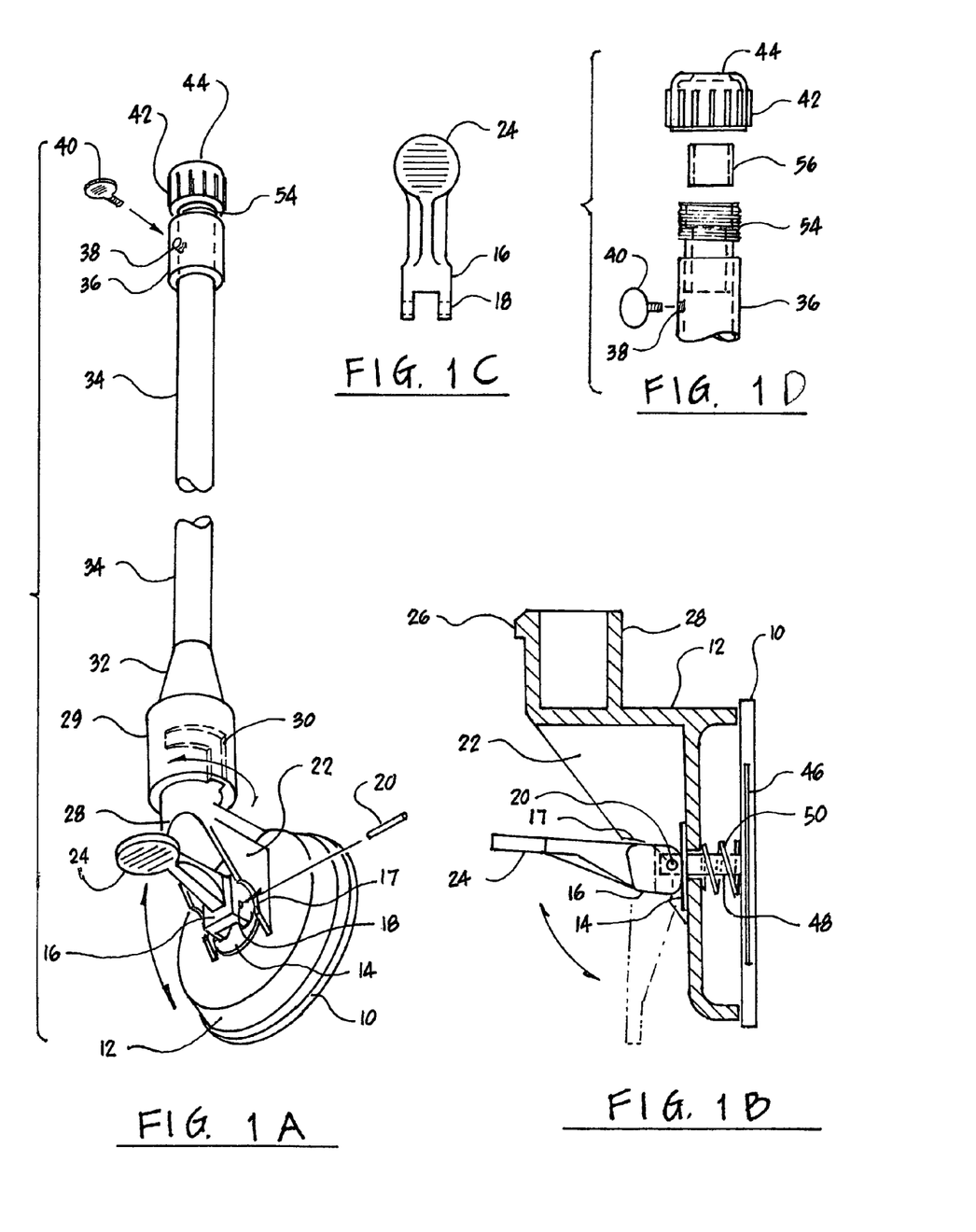
FIG. 1A is a perspective view of a single suction cup mounting apparatus with an attached top body section designed to accept and hold a vertical pole unit.
FIG. 1B is a cross sectional view of the single suction cup base of the mounting apparatus.
FIG. 1C is a detailed view of the handle of the suction cup base of the mounting apparatus.
FIG. 1D is a detailed view of the pressure fitting and thumb screw fastening portion of the top of the body section of the mounting apparatus.

A preferred embodiment of the present invention is illustrated in FIG. 1A. The interlocking, construction and utility of the present invention will be made clear in further illustrations.

FIG. 1A is a perspective view of the present invention that has two main parts: a single suction cup unit and a vertical pole receptacle unit. The base of the suction cup unit is a suction pad (10) of rubber or elastomeric material with a diameter of 5" and a thickness of ¼" mounted under a rounded and slightly smaller diameter suction housing (12) to a handle (24) having a handle base (16) which is fastened to the unit with a pin (20) which extends through the pin hole (18) in the handle base (16) which rests on a metal washer (14). Side support (22) triangular members formed into the top of the suction housing (12) each has a pin slot (17) in the longest side exposing the pin hole (18) for easy insertion or extraction of the pin (20).

The vertical pole receptacle unit is attached to the single suction cup unit by inserting a tooth (26) at the top end of locking arm (28), both shown on FIG. 1B, into the internal ell shaped groove (30) of the socket (29) of FIG. 1A as far as it will go in a straight forward direction and then twisting until tight. The socket (29) is formed into a reducer (32) reducing the inside diameter from 1 to ⅞". This smaller inside diameter is also that of a hollow receptacle tube (34) 18" in length, formed integrally with the reducer (32) and a compression fitting base (36) which has a screw hole (38) in its side for accepting a set screw (40) and a compression fitting nipple (54) with male threads affixed at its top for screwing on a compression fitting cap (42) having an opening at its top. A receptacle inlet (44) is thus provided for inserting the bottom of a pole type member, not shown, the top of which can be a shade, recreational or sport type device.

FIG. 1B is a cross sectional view of the single suction cup unit. It shows the suction pad (10) having a thin metal disk (46) imbedded in it which is connected to a shaft (48) having a spring (50) coiled around it which is contained inside the suction housing (12). The pin (20) is inserted through aligned holes in the handle base (16) and the top end of the shaft (48) thereby fastening the handle (24) to the suction pad (10).

FIG. 1C is a detailed elevation view of the handle (24) with its integral handle base (16) and pin hole (18).

FIG. 1D is a detailed view of the pressure fitting components of compression fitting base (36), compressing fitting nipple (54), compression fitting washer (56) which is made from a flexible and compressible elastomer material, compression fitting cap (42), and the screw hole (38) and set screw (40) for additionally fastening a vertical pole member inserted through the receptacle inlet (44).

Operation—FIGS. 1A, 1B, 1C and 1D

The mounting apparatus shown herein is intended for attaching to a vertical wall or surface that is flat, smooth and clean and oriented so that the receptacle tube (34) is vertical with the receptacle inlet (44) at the top. If the two sections of this mounting apparatus are separated, they should be joined before attachment to a surface by inserting the tooth (26) of the suction cup unit into the groove (30) of the vertical pole receptacle section until there is resistance and then twisting it counter clockwise until locked in place.

Put the suction pad (10) over the location desired for attachment and rotate the handle (24) downward 90° away from locking arm (28). This action causes the handle base (16) to rotate at the pin (20) pivot point and push down on the washer (14) to elevate the shaft (48) which pulls the center of the attached disk (46), which in turn pulls the suction pad (10) in which it is imbedded causing a concave configuration of the suction pad (10) with the surface on which it is mounting which results in a vacuum in the concave sealed space creating a strong suction holding force. This mechanism for creating the suction holding force is the same for all the mounting apparatus described in the invention, regardless of their handle design.

A pole type member, either solid or hollow, not shown, but being of sufficiently small enough diameter to enter the receptacle inlet (44) and slide readily but not too loosely down the receptacle tube (34) is thereby inserted. This pole type member will have a shade producing, recreational, sports or other useful type apparatus connected at its top section which will protrude at a useful height above the compression fitting cap (42) which will then be tightened on the compression fitting nipple (54) securing said pole type member. The set screw (40) is then screwed in the screw hole (38) to additionally secure the pole type member keeping it from moving up or down or rotating.

The pole type member can be removed or replaced by loosening set screw (40) and compression fitting cap (42) and pulling it vertically until it exits the receptacle inlet (44). Detaching the suction cap unit while coupled or uncoupled to the vertical pole receptacle section is achieved by simply releasing the handle (24) by rotating it upward toward the locking arm (28).

Experience has shown this mounting apparatus can stay attached underwater to the side of a swimming pool for a period or weeks or even a month. It is recommended to not leave it installed exposed to extremely windy conditions or to a moving vehicle or boat.

FIGS. 2A, 2B, 2C, 2D and 2E show an embodiment for mounting on a vertical surface with about twice the suction holding power of the prior embodiment while providing a handle design for suction activation which is unobtrusive and safe from objects catching on it, especially in an underwater environment.

Figures 2A, 2B, 2C, 2D, 2E:
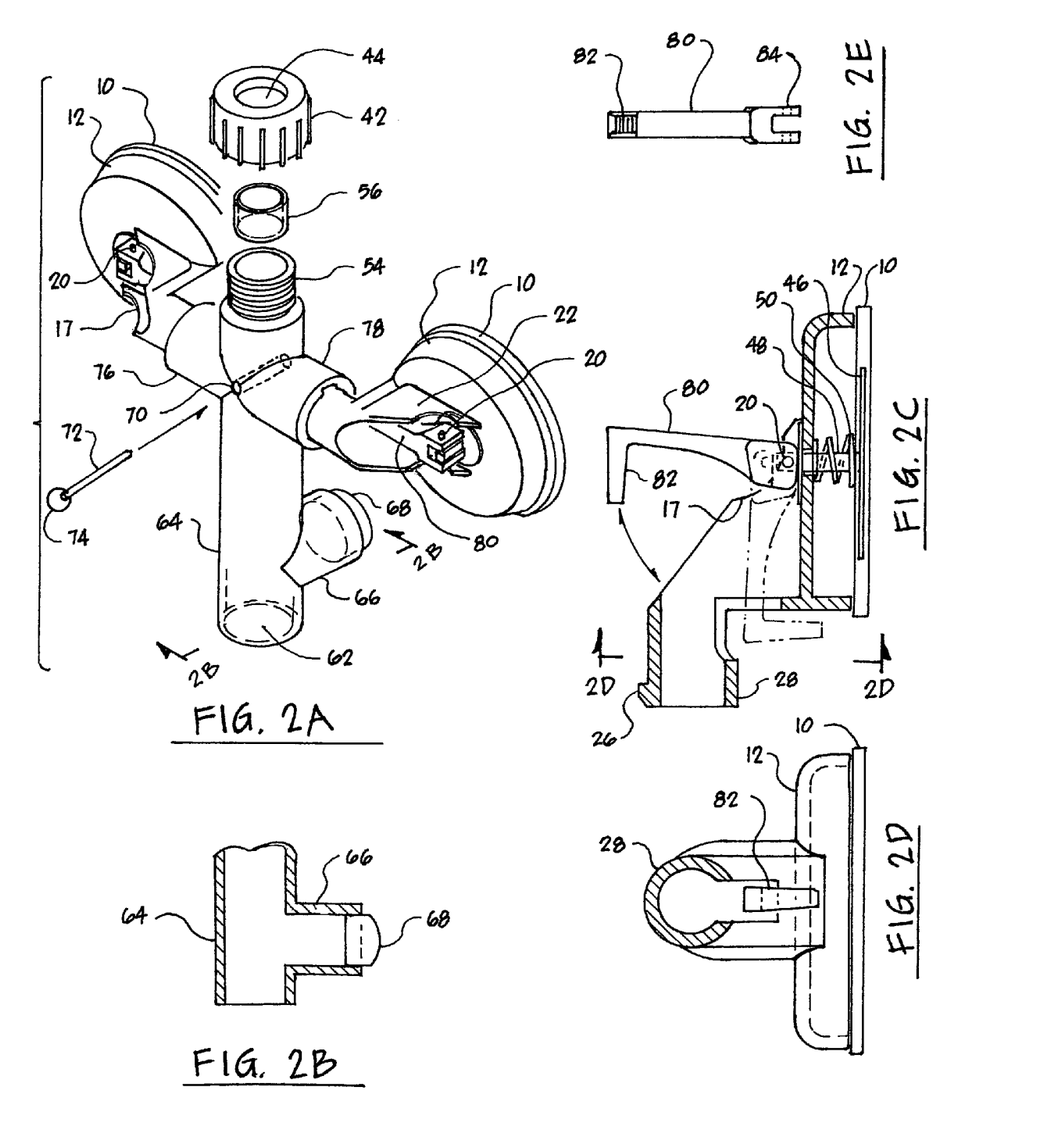
FIG. 2A is a perspective view of a double suction cup mounting apparatus attached to an upper body section designed to accept and hold a vertical pole unit.
FIG. 2B is an elevation view of the detail design section of the top body section keeping the unit vertically aligned.
FIG. 2C is a cross sectional view of one of the suction cup bases with a handle "hidden" when activated.
FIG. 2D is a cross sectional view of the front of a suction cup base taken past the tooth imbedded attachment nozzle.
FIG. 2E is a front view of the handle lever of a suction cup base unit.

FIG. 2A is a perspective view of the present invention having two suction cup units attached to a vertical pole receptacle unit. The activating handle levers (80) of both suction cup units are of a different design than the one shown in FIGS. 1A, 1B and 1C and are both shown in the suction activated or down position having been rotated toward and sheltered by locking arm (28) and side support (22).

Both suction cup units are attached to the pole receptacle unit with the same tooth and groove method used in the prior single suction cup description. The receptacle unit of FIG. 2A contains a pressure fitting at its top comprising a compression fitting cap (42) with its receptacle inlet (44), a compression fitting washer (56) and a compression fitting nipple (54). Said compression fitting nipple (54) is glued or otherwise joined to a tee shaped plastic body having a receptacle pin hole (70) perpendicular to the center of the tee for receiving a stainless steel locking pin (72) with a stainless steel metal ring (74) at the outer end, a formed left arm (76) and right arm (78) each containing an internal groove for accepting the tooth (26) shown in FIG. 2C, a hollow receptacle leg (64), terminating in receptacle outlet (62). A horizontal stabilizing arm (66) with an end plastic or elastomer bumper (68) protrudes from receptacle leg (64) perpendicular to left arm (76) and right arm (78) the distance necessary to touch the vertical surface to which the suctions cup units are connected so that the vertical pole unit remains in the vertical plain.

FIG. 2B is a detailed side view of the stabilizing arm (66) and its end bumper (68) connected to the receptacle leg (64).

FIG. 2C is a cross sectional side view of a suction cup unit having a plastic handle lever (80) with an integral plastic handle arm (82) at a 90° angle at the end, which when rotated downward past the locking arm (28) activates the suction holding force and is partially hidden and unobtrusive.

FIG. 2D is a detailed cross sectional front view of a suction cup unit with the handle arm (82) in the down or suction activated position.

FIG. 2E is a detailed front elevation view of the handle lever (80), its handle arm (82) and the handle pin hole (84) in the handle housing.

Operation—FIGS. 2A, 2B, 2C, 2D and 2E

This mounting apparatus is intended for attachment to a vertical surface and oriented with the receptacle inlet (44) at the top. After placing the two suction cup units in position the handle lever (80) and handle arm (82) of each are rotated 90° downward toward the locking arm (28). This design handle provides a low profile when activated and therefore offers less chance of an article such as clothing getting caught on it.

A pole type member with a hole in it perpendicular to its longitudinal axis and the diameter of receptacle pin hole (70) is inserted into the receptacle inlet (44) until its bottom protrudes past the receptacle outlet (62) and the hole in it aligns with receptacle pin hole (70). Locking pin (72) is then fully inserted in receptacle pin hole (70) and filling the hole in the pole type member, thus securing it to the mounting device. Compression fitting cap (42) is then tightened providing extra security keeping the pole type member from moving up or down or rotating. Reversing this procedure releases the pole type member and pushing the handle arm (82) upward and rotating it away from locking arm (28) releases the suction cup member.

FIGS. 3A, 3B, 3C, 3D and 3E illustrate an embodiment for mounting either on a vertical or horizontal surface with the suction adhering power of four suction cup units connected as previously described with tooth and groove elements to an upper body unit designed to accept and hold a vertical pole unit through either of two orifices, depending on the mounting orientation. These figures also show a third type handle, utilizing a partially spherical design with results in a very low profile. This handle is key operated which allows the possessor of the key to control the operation and placement of the mounting device.

Figures 3A, 3B, 3C, 3D, 3E:
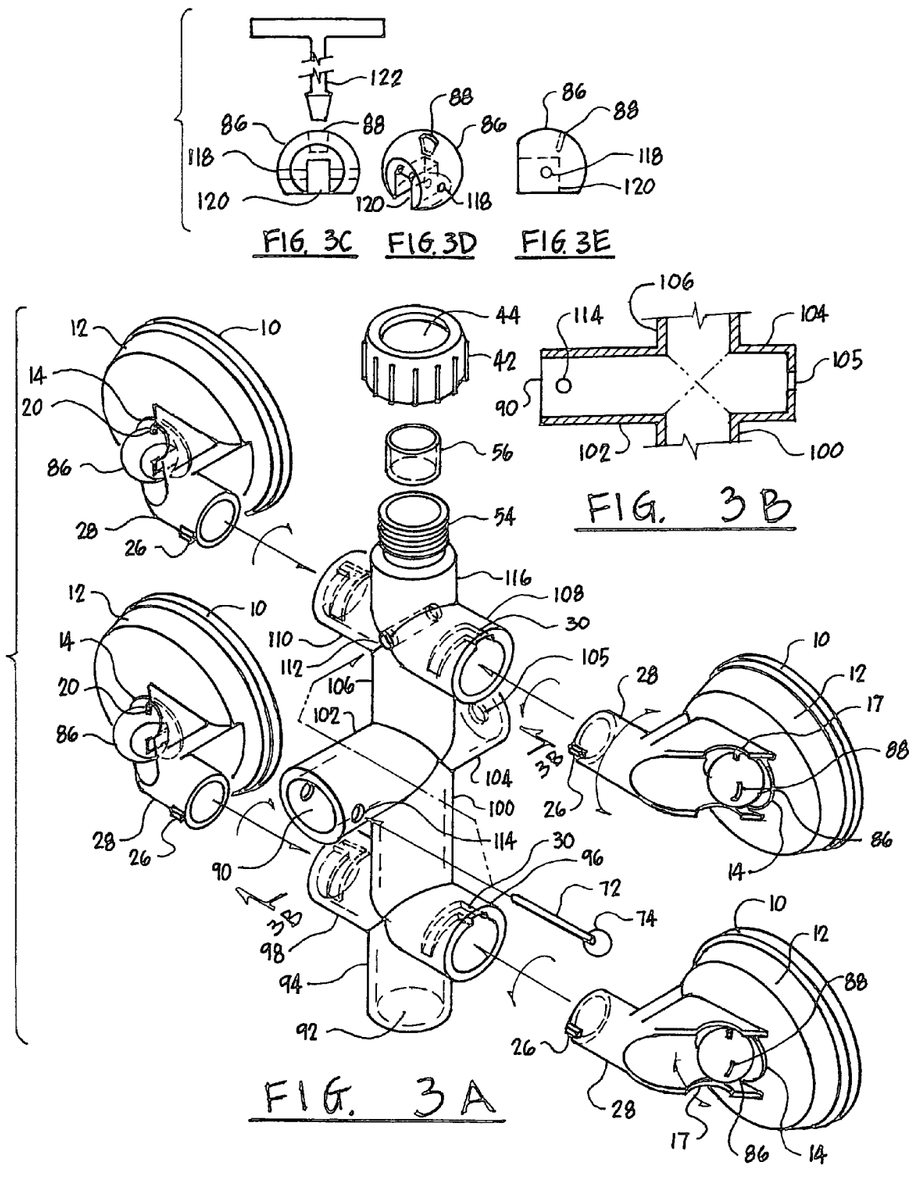
FIG. 3A is a perspective view of a four suction cup mounting apparatus with partially spherical handle levers for attachment to either a vertical or horizontal surface and attached to an upper body section designed to accept and hold a vertical pole unit.
FIG. 3B is a detailed cross sectional view of a tubing portion of the upper body section designed to accept and hold a vertical pole unit when the suction cups of the apparatus are mounted to a horizontal surface.
FIG. 3C is a front view of a partially spherical handle lever and operating key.
FIG. 3D is a perspective view of a partially spherical handle lever.
FIG. 3E is a side view of a partially spherical handle lever.

FIG. 3A is a perspective view of the present invention having four suction cup units attached by inserting a tooth (26) into a respective groove (30) contained in the hollow arms of the PVC plastic upper body unit. A right top arm (108) and left top arm (110) form a tee configuration with a hollow top receptacle tube (116) and a hollow receptacle tube (106), the center of the tee having a vertical mounting pin hole (112) through it for insertion of a stainless steel locking pin (72) with a stainless steel ring (74) at its end. Receptacle tube (106) forms the top portion of another hollow tubular tee configuration rotated 90° from the one above with a 6" long, ⅞" inside diameter horizontal mounting receptacle (102) having a horizontal mounting pin hole (114) for insertion of locking pin (72) near its open horizontal mounting receptacle mounting inlet (90), the opposite end of the tee being horizontal mounting bottom receptacle (104) with a weep hole (105) at its end facing the surface to which the suction units are to be mounted. A lower receptacle tube (100) forms the bottom portion of this tee tubular configuration and also the top portion of another and lower tubular tee formation oriented parallel to the uppermost tubular tee formation with a right bottom arm (96), a left bottom arm (98) and a bottom leg (94) terminating in a receptacle outlet (92).

A ball handle (86) exhibited in each of the four suction cup units contains a key slot (88) for controlled activation of the suction force.

FIG. 3B is a cross sectional drawing of the tubular tee section for accepting and holding a pole type element in fixed position when the four suction cup units are mounted to a horizontal surface.

FIG. 3C is an elevation cross sectional drawing of the ball handle (86) showing the orientation of the key slot (88), a key (122) for insertion into the ball handle and control of its function, a ball handle pin hole (118) and a ball handle cavity (120) which fits on a shaft which is connected to the suction pad (10).

FIG. 3D is a perspective view of the elements of the ball handle (86).

FIG. 3E is a side view elevation of the ball handle (86) and its related elements.

Operation—FIGS. 3A, 3B, 3C, 3D, and 3E

This mounting apparatus can be attached to either a vertical or horizontal surface. The four suction cup units differ from those described prior only in the use of a different handle design—the ball handle (86). This handle is activated to provide the holding suction by inserting a key (122) in the key slot (88) and rotating it 90°. Deactivation results when rotated 90° in the opposite direction using key (122).

If mounted on a vertical surface the pole type member is inserted into the receptacle inlet (44) at the top until its bottom protrudes past the receptacle outlet (92) and the hole in it aligns with the vertical mounting pin hole (112). Locking pin (72) is then inserted through vertical mounting pin hole (112) and the aligned hole in the pole type member securing it to the mounting apparatus. Compression fitting cap (42) is then tightened additionally securing the pole type member from moving up, down or rotating. Reversing this procedure allows the pole type member to be removed.

The mounting apparatus can be attached to a horizontal surface facing any direction. Each of the suction cup units is activated and then a pole type member is inserted into the horizontal mounting receptacle inlet (90) far enough for a hole in the pole type member to align with the horizontal mounting pin hole (114). Locking pin (72) is then inserted through both holes far enough to secure the pole type member from moving up, down or rotating. Removing the locking pin (72) by pulling it out by gripping and pulling on ring (74) unsecures the pole type member for removal.

Figure 4:
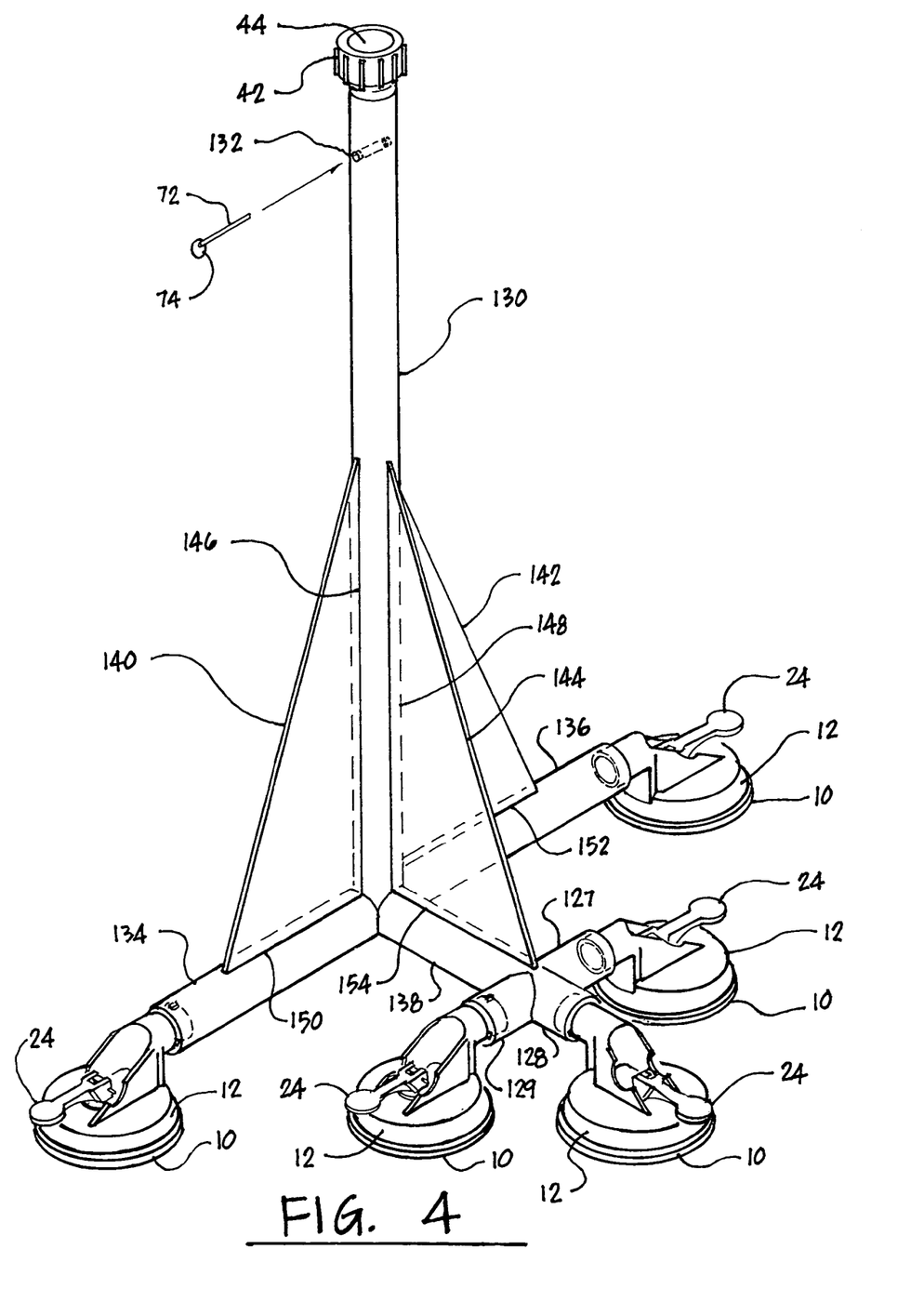
FIG. 4 is a perspective view of a five suction cup mounting apparatus each having standard handles, attached to an upper body section with reinforced sheeting, designed to accept and hold a vertical pole unit.

An additional embodiment of the present invention is shown in FIG. 4 in which multiple suction cup units in excess of four required to fasten heavier and more cumbersome poles or pole supporting objects exposed to more extreme conditions such as heavy winds or sports paraphernalia being bombarded by heavy objects like large balls. This embodiment shows how if additional support is required for mounting and holding a particular object, additional suction cup units can be manifolded together with vertical pole receptacle support elements to provide stronger and more secure mounting structures.

FIG. 4 is a perspective view of a five suction cup mounting apparatus comprised of the three main element groups: five suction cup units, a hollow PVC plastic tubing network and three triangular plastic support plates. Each of the suction cup units have a handle (24) shown activated (suction in force) in the downward position and is connected using the tooth and groove method shown and described in FIG. 1A and FIG. 1B to either short right arm (127), short center arm (128), short left arm (129), right extension arm (136) or left extension arm (134). All of these tubing arms are connected in a lower small and an upper large tee horizontal configuration by a center extension arm (138) with a long receptacle tube (130) 3 feet in length and ⅞" inside diameter formed perpendicular to and above the center of the large tee configuration and containing a pin hole (132) for inserting the locking pin (72) which has a ring (74) on the non-inserting end. The top of long receptacle tube (130) has a compression fitting which terminates in the compression fitting cap (42), the top entrance to which is the receptacle inlet (44).

A plastic left anchor plate (140) supports the connection between the long receptacle tube (130) with an epoxy or water proof glue along a left plate vertical seal (146) and the left extension arm (134) with epoxy or water proof glue along a left plate bottom seal (150). A plastic right anchor plate (142) supports the connection between the long receptacle tube (130) with an epoxy or water proofed glue along a vertical connection not shown and the right extension arm (136) with epoxy or water proof glue along a right plate bottom seal (152). A plastic center anchor plate (144) supports the connection between the long receptacle tube (130) with an epoxy or water proofed glue along a center plate vertical seal (148) and the center extension arm (138) with epoxy or water proof glue along a center plate bottom seal (154).

Operation—FIG. 4

The mounting apparatus illustrated herein is for attachment to a horizontal surface, such as the bottom of a swimming pool, and can face any direction. Although it contains five suction cup units for considerable holding power and appears larger than other units, its installation is relatively simple. Each of the suction cup units are activated by rotating its handle (24) downward 90°. Then a pole type member is inserted into the top receptacle inlet (44) until a hole in the member aligns with pin hole (132). Locking pin (72) is inserted through both aligned holes thus securing the pole type member to long receptacle tube (130). Additional fastening is provided by tightening compression fitting cap (42).

Reversing the above actions results in releasing the individual elements.

Figure 5A:
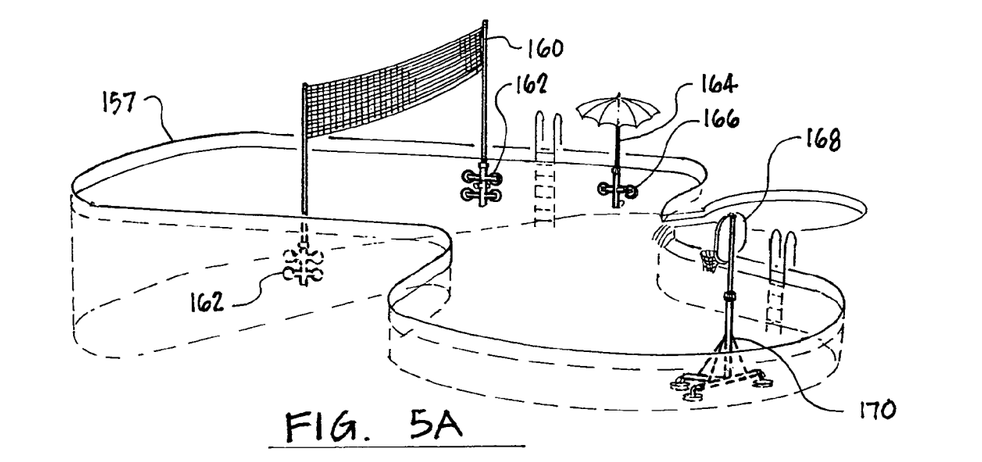
FIG. 5A is a perspective view of a swimming pool with a double suction cup apparatus vertically mounted supporting an umbrella for shade, two four suction cup apparatus vertically mounted supporting a volleyball net and a five suction cup apparatus mounted horizontally and supporting a basketball backboard and net.
Figure 5B:
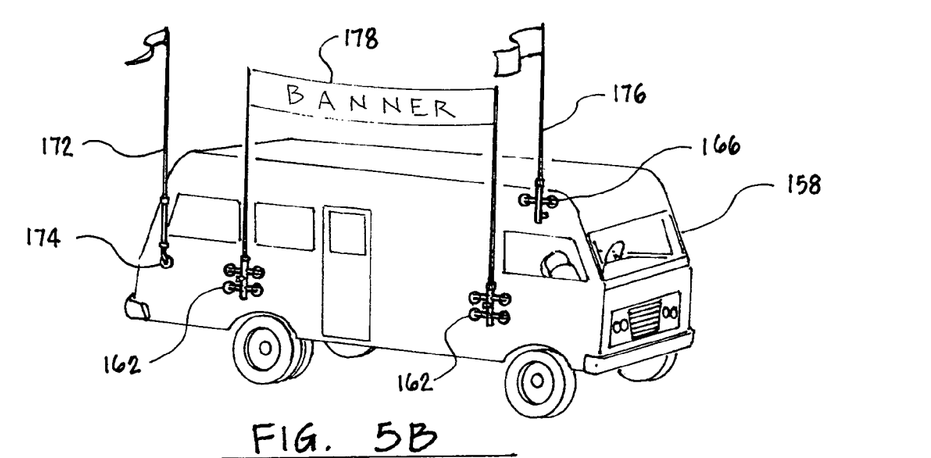
FIG. 5B is a perspective view of a recreational vehicle with a single suction cup apparatus mounted vertically and supporting a small triangular banner, a double suction cup apparatus mounted vertically and supporting a flag and two four suction cup apparatus mounted vertically supporting two poles holding a wide banner.
Figure 5C:
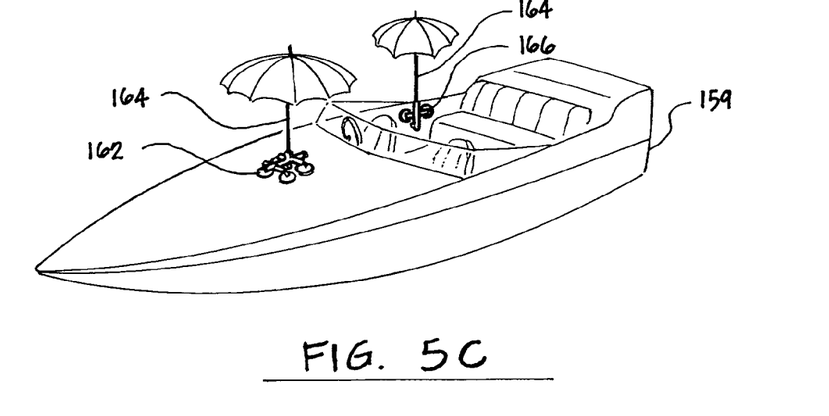
FIG. 5C is a perspective view of a boat with a double suction cup apparatus mounted vertically supporting a small shade umbrella and a four suction cup apparatus mounted on its horizontal deck supporting a large shade umbrella.

The variety and range of preferred embodiments are shown in FIGS. 5A, 5B and 5C.

FIG. 5A is a perspective view of an in ground swimming pool (157) containing several installed applications of the present invention. A volleyball net (160) is mounted across the pool width utilizing two separate four suction cup mounting apparatus (162). An umbrella (164) for producing shade is mounted on a side of the pool with a double suction cup mounting apparatus (166). A basketball backboard, net and pole (168) is mounted on the bottom of the pool with a five suction cup mounting apparatus (170).

FIG. 5B is a perspective view of a recreational vehicle (158) containing several applications of the present invention. A pendant and pole (172) is mounted at the rear side with a single suction cup mounting apparatus (174). A wide banner and two poles (178) are mounted along the side of the vehicle utilizing one four suction cup mounting apparatus (162) to support each pole. A flag and pole (176) is mounted near the front of the vehicle with a double suction cup mounting apparatus (166).

FIG. 5C is a perspective view of a boat (159) containing several applications of the present invention. A large umbrella (164) is mounted on the deck of the boat (159) with a four suction cup mounting apparatus (162) and a smaller umbrella (164) is mounted on an inside vertical surface of the boat (159) with a double suction cup mounting apparatus.

Advantages

From the description above, a number of advantages of the invention become evident:

a) Activating the holding power of a suction cup member with the simple manual rotation of a handle lever results in quick and easy installation.

b) Deactivating the suction holding power by reversing the handle lever rotation results in quick and easy detachment of the mounting apparatus.

c) Since the mounting apparatus is noninvasive, it can be reused again and again.

d) The ability use the mounting apparatus on any solid, smooth, flat, clean surface, whether horizontal, vertical or at any angle in between greatly expands its application and increases the locations in which it may be applied.

e) Since the mounting apparatus can be noninvasively affixed to a wet, underwater or dry surface, its application flexibility is extensive and includes use in or on swimming pools, and non-fast moving automobiles, recreational vehicles and boats.

f) The ease of attaching and detaching suction cup members from vertical pole receptacle units facilitates the packaging and transporting of the mounting apparatus and additionally allows for easy replacement of suction cup members.

g) The pin holding the handle lever of a suction cup member can be accessed and extracted easily, thereby facilitating the economical disassembly, replacement and repair of its parts.

h) The use of a small ball type handle containing a key slot for insertion of a key for activating a suction cup member allows the possessor of the key control over its operation, which is especially desirable for commercial installations such as at hotel swimming pools.

i) The use of specially tested rubber or elastomer material, such as neoprene, silicone, and the like such that the suction pads means do not mark the surfaces on which it is applied.

j) Configurations of the mounting apparatus can vary in number of suction cup members, thereby matching the suction power required for holding different weight and wind effected objects.

k) The hollow tubular nature and plastic materials of construction of much of the mounting apparatus results in a relative lightweight product which offers ease of handling and reduced shipping costs.

CONCLUSION, RAMIFICATIONS AND SCOPE

Accordingly, the elements and combinations of the mounting apparatus provide for an easily installable and detachable device that can be affixed to a wet or dry vertical or horizontal surface without harming said surface by persons of almost any age. It is ideal for use in various parts of a swimming pool, including along all sides and the bottom, as well as on vehicles, boats and stationary structures. The lightness of the apparatus and ability to easily and quickly disassemble its major components allow it to be produced and shipped economically.

While the above description contains many specificities, these should not be construed as limitations on the scope of the invention, but as merely involving illustrations of some of the presently preferred embodiments thereof. Many other variations are possible. For example, many of the receptacle holder tubing framework components may be made longer, shorter, of a different diameter, having different ends, of a lighter or stronger material, and of white, black or different colors.

Thus, the scope of the invention should be determined not by the embodiments presented, but by the appended claims and their legal equivalents.

I claim:

1. A mounting apparatus capable of noninvasive installation on a wet or dry, strong, flat, smooth and clean surface for grasping a vertical pole type member with a shade producing or sports or recreation oriented device at its top, said apparatus comprising:

(a) at least one lever handle activated strong suction cup member;

(b) a receptacle unit comprising a top end, wherein the top end includes a compression fitting adapted to receive and secure said vertical pole type member; and (c) a means for connecting the suction cup member to the receptacle unit, wherein the means for connecting the suction cup member to the receptacle unit of a includes a tooth member on the suction cup member and an internal ell shaped groove in the receptacle unit whereby the tooth member passes through the ell shaped groove, wherein the at least one lever handle on the suction cup member is at least partially hidden inside the suction cup member when suction force is activated.

2. The mounting apparatus of claim 1 wherein the at least one lever handle on the suction cup member is controlled by movement of a key type device inserted in a slot in the at least one lever handle.

3. A detachable mounting system for use with sporting equipment, comprising:

(a) a mounting apparatus comprising at least one lever handle activated strong suction cup member;

(b) a pole member having a top end;
(c) a sporting equipment component attached to the ton end of the pole member;
(d) a receptacle unit attached to the mounting apparatus, wherein the receptacle unit is adapted to receive the pole member;
(e) a second mounting apparatus comprising at least one lever handle activated strong suction cup member;
(f) a second pole member having a top end, wherein the sporting equipment component is further attached to the top end of the second pole member; and
(g) a second receptacle unit attached to the second mounting apparatus, wherein the second receptacle unit is adapted to receive the second pole member.

4. A detachable mounting system for use with sporting equipment, comprising:

(a) a mounting apparatus comprising at least one lever handle activated strong suction cup member;
(b) a pole member having a top end;
(c) a sporting equipment component attached to the top end of the pole member;
(d) a receptacle unit attached to the mounting apparatus, wherein the receptacle unit is adapted to receive the pole member;

wherein the mounting apparatus and the second mounting apparatus each further comprise a plurality of lever handle activated strong suction cup members.

* * * * *